Feb. 26, 1929.  
K. A. BRAUNING  
AUTOMOBILE LOCK MEANS  
Filed Aug. 4, 1926  
1,703,812  
3 Sheets-Sheet 1
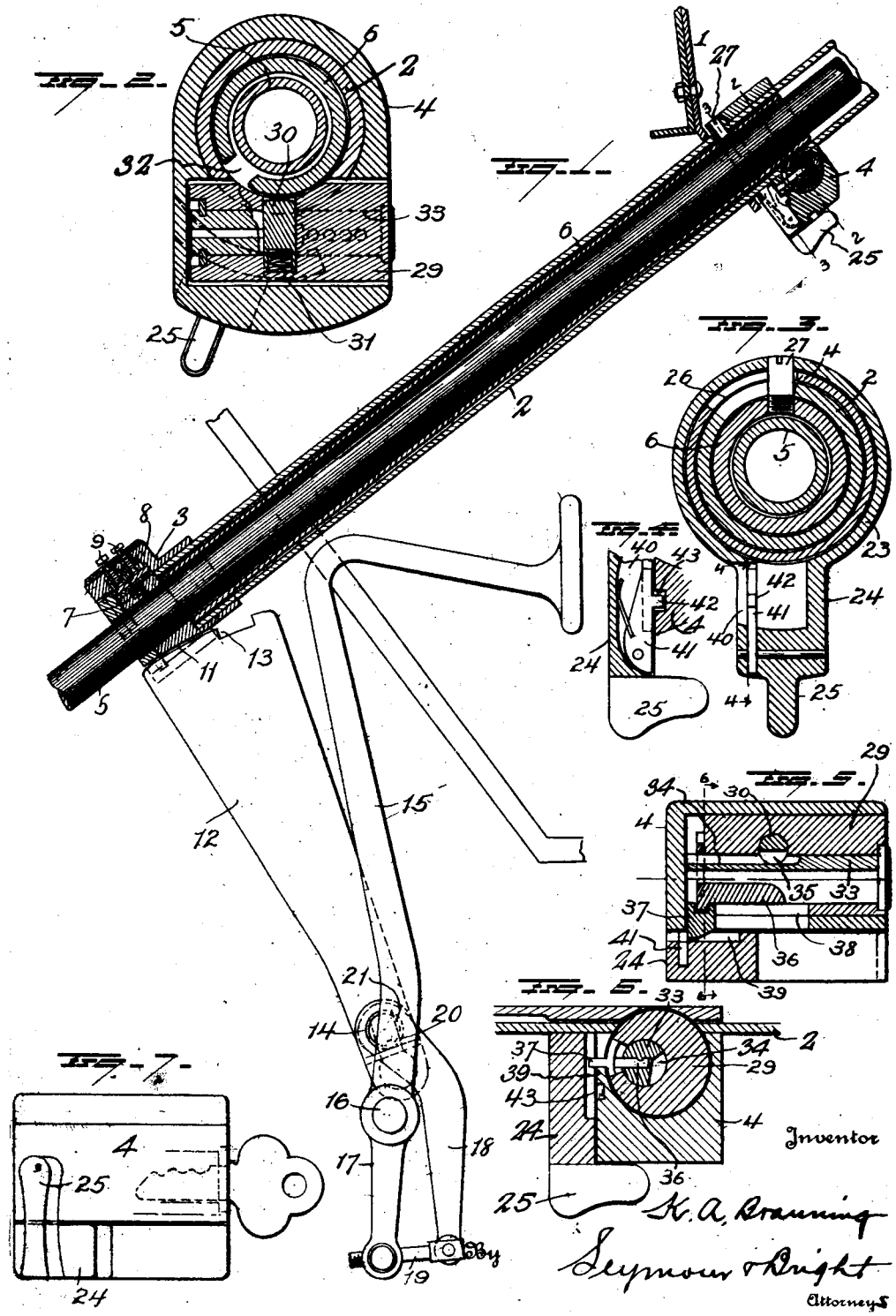

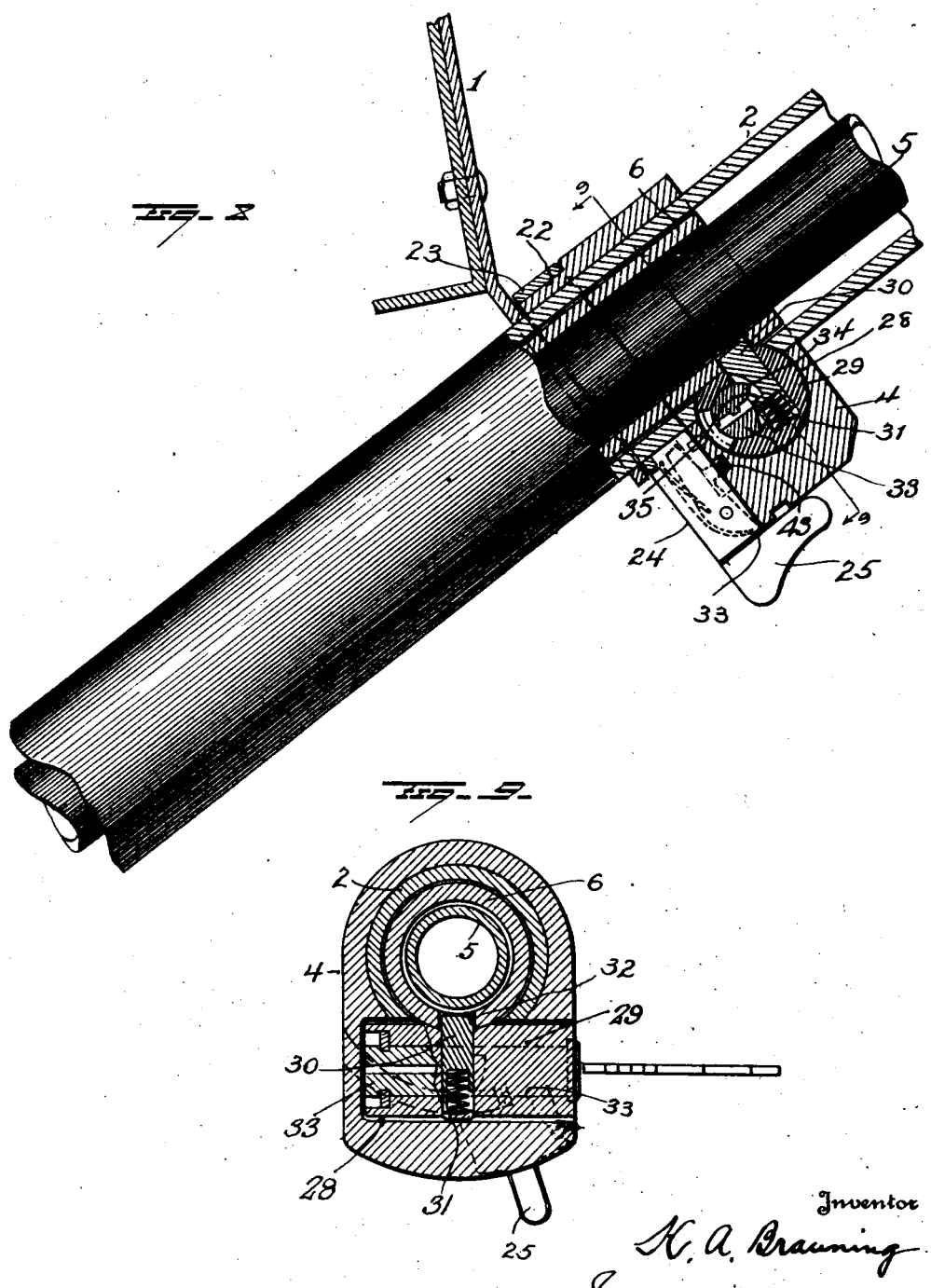

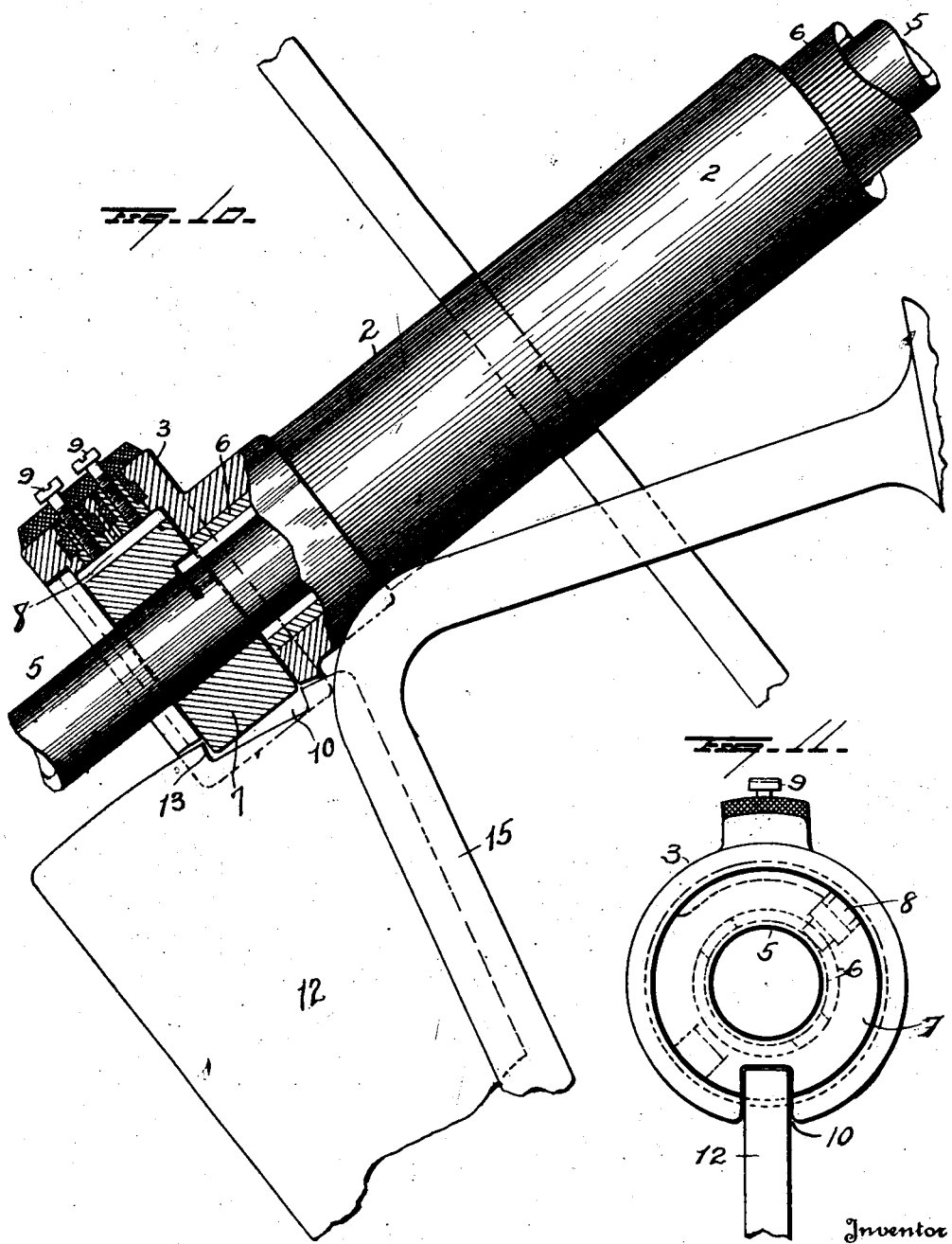

Patented Feb. 26, 1929.

1,703,812

UNITED STATES PATENT OFFICE.

KARL A. BRAUNING, OF STAMFORD, CONNECTICUT, ASSIGNOR TO THE YALE & TOWNE MANUFACTURING COMPANY, OF STAMFORD, CONNECTICUT.

AUTOMOBILE LOCK MEANS.

Application filed August 4, 1926. Serial No. 127,111.

This invention relates to improvements in locking means for automobiles,—one object of the invention being to provide efficient means operable within and protected from attack by the steering head, to lock the controlling means of an automobile in inoperative condition.

A further object is to provide, in automobile locking means including a key-operated lock, simple and efficient means to prevent the key from being left in the lock after the control elements of the automobile shall have been locked.

A further object is to provide locking mechanism including a key-operated lock, for a plurality of control elements of an automobile, which mechanism shall be operable by a single movement of a control lever to lock said plurality of control elements and eject the key of the key-operated lock.

A further object is to provide locking mechanism including a key-operated lock, for locking the clutch shaft and pedal and opening the ignition circuit of an automobile, which shall be operable, after the pedal lever shall have been depressed to disconnect the engine, by a single movement of a control lever to lock the clutch shaft and pedal lever, open the ignition circuit, and eject the key of the key-operated lock.

With these and other objects in view, the invention consists in certain novel features in construction and combinations of parts as hereinafter more fully described and pointed out in the claims.

In the accompanying drawings:

Figure 1 is a view partly in section and partly in elevation showing an application of my improvements with the parts in unlocked position.

Figure 2 is a view in section on the line 2—2 of Figure 1.

Figure 3 is a view in section on the line 3—3 of Figure 1.

Figure 4 is a detail view showing portions of the control lever and key ejecting means.

Figure 5 is a longitudinal sectional view showing the key-operated lock and key ejector.

Figure 6 is a section on the line 6—6 of Figure 5.

Figure 7 is a view in elevation showing the key-operated lock and control lever.

Figure 8 is an enlarged view partly in section showing the control lever and key-operated lock and their relation to other parts.

Figure 9 is a view in section on the line 9—9 of Figure 8.

Figure 10 is an enlarged view partly in section showing the circuit breaker for the ignition circuit and lock means for the clutch shaft and pedal lever, and Figure 11 is a view in elevation at right angles to Figure 10.

A portion of a dash board is represented at 1 and through which, a tubular steering column 2 passes. The lower end of the steering column is secured to a housing 3 and to the upper portion of said steering column, a housing 4 is secured in proximity to the dash board. A steering rod or shaft 5 extends through the steering column and located within the latter and surrounding said steering rod or shaft is a tubular member 6, the lower end of which carries a head 7 located within the housing 3. The member 6 and its head 7 are mounted to turn and the latter carries a contact plate 8 to cooperate with contacts 9—9 carried by and insulated from the housing 3. In this manner a circuit breaker is provided for the ignition circuit of the automobile. The under portion of the housing 3 is recessed as at 10 and the head 7 is recessed as at 11, Figure 1, to permit movement of a locking cam arm 12 from the position shown in Figure 1 to the position shown in Figure 10. The cam arm, which is connected with the clutch shaft as presently explained, is provided at its upper end with a recess forming a shoulder 13 which, when the head 7 is turned from the position shown in Figure 1 to the position shown in Figure 10, will be engaged by the side of the head 7 and thus lock the clutch shaft and pedal lever against movement.

The clutch shaft is shown at 14 and the clutch or pedal lever is indicated at 15. The clutch pedal is mounted on a shaft 16 and provided with an arm 17 depending below said shaft. The clutch shaft 14 is provided with an arm 18 and said arms 17 and 18 are adjustably connected by a screw 19. To facilitate the assembling of the cam arm 12 on the clutch shaft 14, said cam arm is provided near its lower end with a slot 20 having one end rounded to permit said arm to be slipped over the shaft 14 and the latter is flattened as at 21, to be engaged by the parallel walls of the slot. When the cam arm 12 shall have been assembled on the shaft 14, it may be keyed thereto.

The housing 4 is provided with a recessed portion 22 in which the circular or strap portion 23 of a control lever 24 is mounted to turn,—said control lever being located under a portion of the housing 4 and provided with a handle member 25. The steering column 2 and housing 4 are circumferentially slotted as at 26, Figure 3, for the accommodation of a pin 27 which is secured to the tubular member 6 and enters a suitable hole in the circular or strap member 23 of the control lever so that when said control lever is moved, the member 6 will be turned to effect the locking or unlocking of the cam arm 12 on the clutch shaft and to effect the opening or closing of the ignition circuit.

The housing 4 is provided with a suitable transverse bore 28 in which the cylinder 29 of a key controlled lock is secured, said cylinder carrying a bolt 30 to be projected by a spring 31 and caused to enter a suitable hole 32 in the member 6 to lock the latter. It will be noted, on reference to Figs. 8 and 9, that the bolt is located between the ends of the cylinder and moves on a line parallel with a diameter thereof. The plug 33 of the lock is provided with a suitable cam 34 to engage a shoulder 35 on the bolt for withdrawing the latter when said plug is operated with the use of a proper key.

A key ejector 36 enters the key slot of the lock plug 33 and is connected at one end to a carrier 37, the latter being movable in slotted portions 38 in the lock cylinder and plug and in a groove 39 in the control lever. The control lever 24 is made with a recess 40 for the accommodation of a pivoted, spring-pressed lever 41 provided with a lug or projection 42 which enters a groove 43 in the housing 4. The bottom of this groove is made beveled or inclined. The control lever 24 operates the ejector 36 by means of carrier 37 which is moved by the spring-pressed lever 41 carried by said control lever, so that when the control lever is moved to the locked position, it carries with it, the carrier 37 and ejector 36 thus ejecting the key if left in the lock plug. As the control lever approaches the locked position, the spring-pressed lever 41 is forced downward by the gradual shallowing of the groove 43 within which the lug on said lever 41 travels, so that when the key is inserted to unlock the mechanism, the key ejector can be pushed back over the top of the lever 41 and into the "unlocked" position as in Figure 5. When the lever 24 is moved in a direction to turn the member 6 for locking the clutch shaft and pedal lever and for opening the ignition circuit, the lever 41 will engage the carrier 37 and thus cause the ejector 36 to be moved longitudinally in a manner to eject the key from the lock.

It will be observed that with my improvements, the actuating member 6 is enclosed within the steering column and protected by the latter from attack and it will also be seen that when the control lever is moved to locking position, the key of the lock will be ejected.

In operating my improvements to lock the clutch shaft and open the ignition circuit, the clutch pedal must first be depressed to disconnect the engine and move the cam arm 12 to the position shown in Figure 10; after which the lever 24 will be operated to turn the actuating member 6 and the head 7 to open the ignition circuit and lock the cam arm 12 as shown in said Figure 10. When the lever 24 shall have been thus operated, the bolt 30 will snap into locked engagement with the actuating member 6. To place the automobile control means in operative condition, the bolt 30 will be retracted with the use of a key and the lever will be then operated to turn the actuating member 6.

In my copending application Serial No. 127,110 filed simultaneously herewith, I have shown and described means for locking the steering rod with which the steering wheel is connected and if desired, similar locking devices for the steering rod and wheel may be embodied in the construction herein shown and described.

Having fully described my invention what I claim as new and desire to secure by Letters-Patent, is:—

1. The combination with a steering column, and a clutch shaft, of a cam arm carried by the clutch shaft, an actuating member within the steering column, a head carried by said member and cooperable with said cam arm to lock the clutch shaft, a manually operable lever for turning said actuating member and its head, and key-controlled means for locking said actuating member and lever.

2. The combination with a steering column, a clutch shaft, and a circuit breaker for the ignition circuit, of an actuating member housed in the steering column, a head carried by said member, said head carrying the movable member of said circuit breaker, a cam arm carried by the clutch shaft and cooperable with said head, a manually operable lever connected with said actuating member for turning said member and the head carried thereby, and key-controlled means to lock said member and lever.

3. The combination with control means for an automobile, of locking means for said control means, said locking means including an actuating member, a manually operable lever for operating said member, key-controlled lock means for locking said actuating member, and a key ejector operable by said lever.

4. The combination with a steering column and control means for an automobile, of locking means for said control means, said locking means including an actuating member housed in the steering column, a manually operable lever supported by the steering column and operatively connected with said actuating member, a key-controlled lock associated with the steering column for locking said actuating member, an ejector for the key of said key-operated lock, and means operable by said manually operable lever for operating said ejector to eject a key from said key-operated lock.

5. The combination with locking means including an actuating member, of a manually operable lever for moving said actuating member, a key-controlled lock for locking said actuating member, a key ejector in the key-way of said lock, and a lever carried by the manually operable lever for actuating the key ejector when said manually operable lever is moved toward locking position.

6. The combination with locking means including an actuating member, of a manually operable lever for moving said actuating member, a key controlled lock for locking said actuating member, a key ejector in the key-way of said lock, a spring-pressed lever carried by the manually operable lever for actuating the key ejector when the manually operable lever is moved toward locking position, and means for depressing the spring-pressed lever whereby upon subsequent insertion of a key in the lock, the ejector will be moved by the key.

7. The combination with locking means including an actuating member, of a manually operable lever for moving said actuating member, a housing having a beveled surface, a key-controlled lock mounted in said housing and operable to lock said actuating member, a key ejector in the key-way of said lock, a spring-pressed lever carried by the manually operable lever for operating said key ejector to eject a key when the manually operable lever is moved toward locking position, said spring-pressed lever having a part movable on the beveled surface of the housing to depress said spring-pressed lever.

8. In locking means for automobiles, the combination with a steering column, and a clutch shaft, of a cam arm movable with the clutch shaft, an upper housing near the upper end of the steering column, a lower housing at the lower end of said steering column, an actuating member housed in the steering column, a manually operable lever connected with said actuating member near the upper housing, a lock carried by said upper housing for locking said actuating member, a head in the lower housing and connected with said actuating member, said head being cooperable with said cam arm to lock the clutch shaft, a circuit breaker for the ignition circuit of the automobile, said circuit breaker comprising contacts carried by the lower housing and a movable contact carried by and movable with said head.

9. The combination with locking means including an actuating member, of a manually operable lever for moving said actuating member, a key-controlled lock for locking said actuating member, a key ejector in the key-way of said lock, a movable carrier for said ejector, and a lever carried by the manually operable lever and cooperable with said carrier to move the ejector to eject a key when said manually operable lever is moved toward locking position.

10. In a lock, a lock control member movable from a neutral to an active position, a lock for locking said member in said active position, said lock being key operable and having a key ejector, said key ejector being operated to eject the key when said control member is moved to its active position.

11. In a lock, a locking member movable from unlocking to locking position, a lock for locking said member in locking position, said lock being key operable and having a key ejector mounted in the keyway thereof, said ejector being movable relatively to said keyway to eject the key when the locking member is moved to locking position.

12. In a lock, a locking member movable from unlocking to locking position, a lock for locking said locking member in locked position, a key ejector adapted to eject a key from said lock, and means operable by said locking member while moving to locked position to actuate said ejector to eject the key.

13. In a lock, a locking member movable from unlocking to locking position, a key operated cylinder lock for locking said locking member in locked position, a key ejector adapted to lie in the key-way of said cylinder lock and movable to eject the key thereof, and means operable by movement of said locking member to actuate said ejector to eject the key.

14. In a lock, a locking member movable from unlocking to locking position, a cylinder lock operable by a key and adapted to lock said member in its locking position, and means operable with said locking member while moving to locking position adapted to eject the key from said cylinder lock.

In testimony whereof, I have signed this specification.

KARL A. BRAUNING.